United States Patent
Östlund et al.

(10) Patent No.: US 9,169,852 B2
(45) Date of Patent: Oct. 27, 2015

(54) HYDRAULIC PRESSURE TRANSDUCER AND HYDRAULIC SYSTEM

(75) Inventors: Bengt Östlund, Sollentuna (SE); Assar Svensson, Sollentuna (SE); Håkan Ingvast, Själevad (SE)

(73) Assignee: Exencotech AB, Sollentuna (SE)

( * ) Notice: Subject to any disclaimer, the term of this patent is extended or adjusted under 35 U.S.C. 154(b) by 273 days.

(21) Appl. No.: 13/383,437

(22) PCT Filed: Jul. 12, 2010

(86) PCT No.: PCT/SE2010/050810
§ 371 (c)(1),
(2), (4) Date: Jan. 11, 2012

(87) PCT Pub. No.: WO2011/008158
PCT Pub. Date: Jan. 20, 2011

(65) Prior Publication Data
US 2012/0117970 A1 May 17, 2012

Related U.S. Application Data

(60) Provisional application No. 61/225,220, filed on Jul. 14, 2009, provisional application No. 61/225,222, filed on Jul. 14, 2009, provisional application No. 61/225,223, filed on Jul. 14, 2009, provisional application No. 61/225,224, filed on Jul. 14, 2009.

(30) Foreign Application Priority Data

Jul. 14, 2009 (SE) .......... 0950555
Jul. 14, 2009 (SE) .......... 0950556
Jul. 14, 2009 (SE) .......... 0950557
Jul. 14, 2009 (SE) .......... 0950558

(51) Int. Cl.
*F01K 13/02* (2006.01)
*F01B 29/10* (2006.01)
(Continued)

(52) U.S. Cl.
CPC .. *F04F 13/00* (2013.01); *F15B 3/00* (2013.01)

(58) Field of Classification Search
CPC ........... F01D 17/24; F01D 17/18; F01K 7/24; F01K 9/04; F01K 13/02; F01K 7/165; F02C 1/05; F02C 1/10; F02C 1/105; F02C 9/24; F02G 1/02; F03G 7/06; F03G 7/065
USPC .......... 60/527–529, 650, 658, 660, 682
See application file for complete search history.

(56) References Cited

U.S. PATENT DOCUMENTS 3,431,747 A    3/1969 Hashemi et al.
4,186,558 A *  2/1980 Kuo .................. 60/527

(Continued)

FOREIGN PATENT DOCUMENTS

JP    2008-039024    2/2008
WO   2009/072894    6/2009

OTHER PUBLICATIONS

International Search Report for PCT/SE2010/050810.
(Continued)

*Primary Examiner* — Kenneth Bomberg
*Assistant Examiner* — Daniel Wagnitz
(74) *Attorney, Agent, or Firm* — Morgan, Lewis & Bockius LLP (57) ABSTRACT

A power station system operable to generate energy and comprising a heat engine system and a hydraulic system connected thereto. The heat engine system comprises n number of energy cells, wherein n is an integer, and n≥2, a heat source connected to the energy cells, and a cooler means connected to the energy cells. Each energy cell is operable to generate a pressurized fluid when a phase change material (PCM), comprised in each energy cell, changes from solid phase to liquid phase, and the energy cells are operable between a first phase, and a second phase. During the first phase, a first n/2 of the energy cells produce pressurized fluid, and a second n/2 of the energy cells are cooling down, and during the second phase, the first n/2 of the energy cells are cooling down, and a second n/2 of the energy cells produce pressurized fluid. The hydraulic system comprises a pressure transducer, and a hydraulic motor connected thereto, and is operable to generate a constant rotation speed.

8 Claims, 11 Drawing Sheets

(51) Int. Cl.
*F02G 1/04* (2006.01)
*F01K 23/06* (2006.01)
*F04F 13/00* (2009.01)
*F15B 3/00* (2006.01)

(56) References Cited

U.S. PATENT DOCUMENTS

| | | | |
|---|---|---|---|
| 4,235,075 | A | 11/1980 | Erb |
| 4,350,014 | A | 9/1982 | Sanchez et al. |
| 4,973,408 | A | 11/1990 | Keffer |
| 5,117,908 | A | 6/1992 | Hofmann |
| 6,100,600 | A | 8/2000 | Pflanz |
| 6,497,558 | B1 | 12/2002 | Hale |
| 2003/0074900 | A1* | 4/2003 | McFarland ............... 60/670 |
| 2006/0037895 | A1 | 2/2006 | Shumway |
| 2006/0137349 | A1 | 6/2006 | Pflanz |
| 2007/0024058 | A1 | 2/2007 | McClintic |
| 2008/0061560 | A1 | 3/2008 | Peacock |
| 2008/0190848 | A1 | 8/2008 | Oklejas |
| 2008/0216777 | A1* | 9/2008 | Vetrovec ............... 123/41.29 |
| 2008/0245068 | A1 | 10/2008 | Bastawros et al. |
| 2009/0013691 | A1* | 1/2009 | Jones et al. ............... 60/641.7 |
| 2011/0061836 | A1* | 3/2011 | Ingersoll et al. ......... 165/104.13 |
| 2012/0110993 | A1* | 5/2012 | Whittaker et al. ............ 60/517 |

OTHER PUBLICATIONS

International Preliminary Report on Patentability for PCT/SE2010/050810, dated Jan. 17, 2012.

Written Opinion of the International Searching Authority for PCT/SE2010/050810, dated Dec. 3, 2010.

\* cited by examiner

HYDRAULIC PRESSURE TRANSDUCER AND HYDRAULIC SYSTEM

RELATED APPLICATIONS

The present application is a U.S. National Phase Application of International Application No. PCT/SE2010/050810 (filed 12 Jul. 2010) which claims priority to Swedish Application Nos. 0950555-3 (filed 14 Jul. 2009), 0950556-1 (filed 14 Jul. 2009), 0950557-9 (filed 14 Jul. 2009), 0950558-7, (filed 14 Jul. 2009), U.S. Provisional Application Nos. 61/225,220 (filed 14 Jul. 2009), 61/225,222 (filed 14 Jul. 2009), 61/225,223 (filed 14 Jul. 2009), and 61/225,224 (filed 14 Jul. 2009).

BACKGROUND OF THE INVENTION

1. Field of the Invention

The present invention relates to a power station system operable to generate energy.

2. Description of the Related Art

The possibility to generate mechanical or electrical energy from low grade heat is limited. Existing systems based on techniques such as Organic Rankine Cycles, Kalina Cycles and Sterling Cycles suffers from very low overall efficiency when the temperature on the input heat decreases below 60° C. There are no existing technologies that could combine an acceptable efficiency at a competitive cost. It is pointed out that the efficiency is defined as the ratio between output electrical or mechanical energy ($W_e$) and heat input energy (Q).

The patent document US 2009/0013691 A1 relates to an energy producing device disclosed in FIGS. 4 and 5, comprising a PCM heat machine 200, a hydraulic system with a hydraulic fluid 210 and a hydraulic motor 250 used for conversion of hydraulic energy to electrical energy. The hydraulic fluid is adapted to be controlled within the energy producing device in accordance with the density changes of the PCM (see paragraph [0012]). The document discusses mass and cost reductions which can be achieved by use of the device ([0023]).

The patent document US 2008/0061560 A1 relates to a system for generating electrical power signals including at least one heat engine 12 with a piezoelectric transducer element 28, which engine 12 may comprise one or more PCM 26. Mechanical stress on the piezoelectric transducer element 28 causes generation of a sequence of high voltage, low current electrical pulses (see FIG. 1A-B, [0044] and [0054]). The system comprises a pressure control mechanism 40.

The patent document US 2008/0245068 A1 relates to an apparatus for harvesting energy and generating power. The apparatus comprises a phase-change media segregated and contained within an expandable capsule wherein the phase-change media expands upon cooling to create pressure, a carrier liquid that does not change phase in an operating temperature range, a heat exchanger, a separator, a pressurizer, and an engine.

BRIEF SUMMARY OF THE INVENTION

The above mentioned problems are solved by a power station system operable to generate energy according to claim 65. The power station system comprises a heat engine system, and a hydraulic system connected to the heat engine system. Furthermore, the heat engine system comprises n number of energy cells, wherein n is an integer, and n≥2, and a heat source connected to the energy cells, and a cooler means connected to the energy cells. Each energy cell is operable to generate a pressurized fluid when a phase change material (PCM), disposed within each energy cell, changes from solid phase to liquid phase. The energy cells are operable between a first phase, and a second phase, wherein, during the first phase, a first n/2 of the energy cells produce pressurized fluid, and a second n/2 of the energy cells are cooling down, and during the second phase, the first n/2 of the energy cells are cooling down, and the second n/2 of the energy cells produce pressurized fluid. The hydraulic system comprises a pressure transducer, and a hydraulic motor connected to the pressure transducer, and operable to generate a constant rotation speed.

A main advantage with this system is that it is possible to use a heat source with a temperature below 60° C.

A further advantage with this system is that it is possible to use a temperature difference between the heat source and the cooler means as low as 20° C. with an acceptable efficiency and cost.

A further advantage in this context is achieved if the power station system also comprises an electrical generator means connected to the hydraulic motor and operable to generate electricity with a specific frequency and amplitude, and a control system operable to control the process performance based on real time measurements of time, flow, temperature, pressure and power. Hereby it is possible to generate electricity with the same advantage as given above. Furthermore, it is also possible to optimize the process performance.

Furthermore, it is an advantage in this context if the energy cells are connected in a sequence, and if the heat source is connected to the first energy cell, and if the cooler means is connected to the last energy cell, and if, during the first phase, odd-numbered energy cells produce pressurized fluid, and even-numbered energy cells are cooling down, and during the second phase, the odd-numbered energy cells are cooling down, and the even-numbered energy cells produce pressurized fluid. Hereby it is possible to reuse the heat from one step and use it in the next. The overall efficiency is thereby increased.

According to another embodiment it is an advantage if n is an even integer, and if the first n/2 number of energy cells are connected, and work in parallel, and if the second n/2 number of energy cells are connected, and work in parallel.

A further advantage in this context is achieved if the pressure transducer is operable to reduce the pressure in the pressurized fluid from the energy cells.

Furthermore, it is an advantage in this context if the hydraulic motor is operable to generate the constant rotation speed during variable torque, and variable displacement. Hereby the electrical generator means can be simplified.

A further advantage in this context is achieved if the control system also is operable to monitor operational conditions, safety, and service intervals of the power station system. Hereby it is possible to increase the technical lifetime of the power station system.

Furthermore, it is an advantage in this context if the temperature difference, $T_d$, between the heat source and the cooler means is at least 20° C.

It will be noted that the term "comprises/comprising" as used in this description is intended to denote the presence of a given characteristic, step or component, without excluding the presence of one or more other characteristic, features, integers, steps, components or groups thereof.

Embodiments of the invention will now be described with reference to the accompanying drawings, in which:

DETAILED DESCRIPTION OF THE INVENTION

Figure 1:
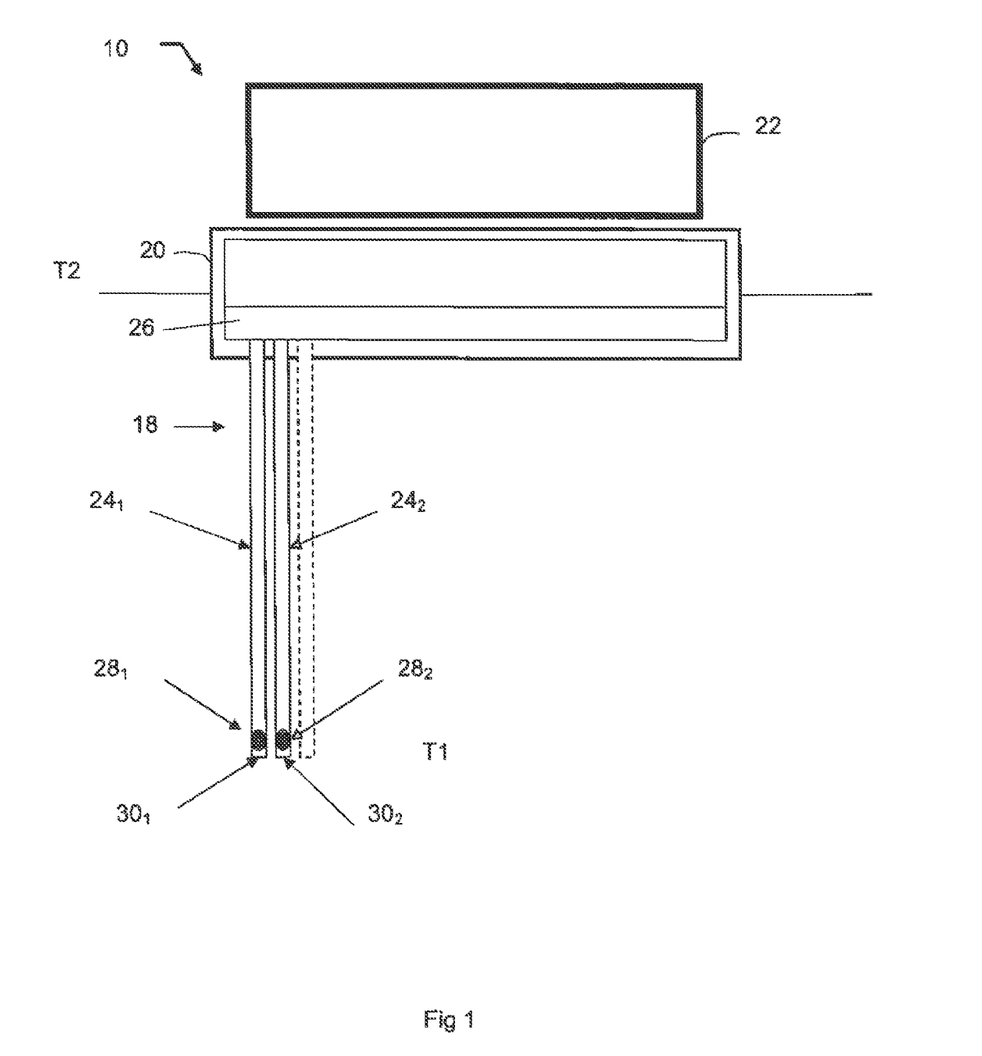
FIG. 1 is a schematic view of a maritime power plant system 10.

In FIG. 1 there is disclosed a schematic view of a maritime power plant system 10. The maritime power plant system 10 is operable to generate energy, and comprises mainly a water supply system 18, a floating platform means 20, and a power station means or system 22. In the general case, the water supply system 18 comprises m number of tube means $24_1, \ldots, 24_m$, wherein m is an integer, and m≥1. In FIG. 1, there is only disclosed two tube means $24_1$ and $24_2$, for the sake of simplicity. Furthermore, a third tube means is also indicated with a broken line. The two tube means $24_1$ and $24_2$ are connected to a reservoir means 26 comprised in the floating platform means 20. As also is apparent in FIG. 1, each tube means $24_1$ and $24_2$ comprises a transporting means $28_i$ and $28_2$ operable to transport water with a first temperature, $T_1$, from one end part $30_1$ and $30_2$ of the tube means $24_1$ and $24_2$ to the reservoir means 26. Expressed with other words, cold water from the ocean depths are transported to the reservoir means 26 with the aid of the transporting means $28_1$ and $28_2$. Furthermore, the power station means 22 comprises a heat engine system 32 (see FIG. 2) comprising n number of energy cells $12_1, \ldots, 12_n$ (see FIGS. 6 and 7), wherein n is an integer, and n≥2. The energy cells $12_1, \ldots, 12_n$ can be connected in a sequence. The heat engine system 32 also comprises a heat source 14 connected to the first energy cell $12_1$, and a cooler means 16 connected to the last energy cell $12_n$. The heat source 14 receives water with a second temperature, $T_2$, via a first feeding tube 34 (see FIG. 3) from the vicinity of the surface of the water. The temperature $T_2$ corresponds to the ocean surface temperature. The cooler means 16 receives water with the first temperature, $T_1$, from the reservoir means 26 via a second feeding tube 36 (see FIG. 3). In order for the maritime power plant system 10 to work, the following relationship has to be fulfilled $T_2 > T_1$. In a most preferred embodiment, $T_2 - T_1 \geq 20°$ C. Each energy cell $12_1; \ldots; 12_n$ is operable to generate a pressurized fluid when a phase change material (PCM), disposed within each energy cell $12_1; \ldots; 12_n$, changes from solid phase to liquid phase. Furthermore, the power station means 22 also comprises a hydraulic system 38 (see FIG. 2) connected to the heat engine system 32, and being operable to generate a constant rotation speed.

According to a preferred embodiment of the maritime power plant system 10, the tube means $24_1, \ldots, 24_m$ are fixed to each other. This means that the design will be stable and be able to resist ocean waves.

According to one alternative the transporting means $28_1$ can be in the form of an electric or hydraulic pump means $28_1$ located in the end part $30_1$ of the tube means $24_1$.

According to another alternative, the transporting means $28_1$ can be in the form of an electric or hydraulic propeller means $28_1$ also located in the end part $30_1$ of the tube means $24_1$.

According to a third alternative, the transporting means $28_1$ can be in the form of a PCM-based water carrier $28_1$ that uses temperature differentials for autonomous propulsion in the tube means $24_1$. For a more detailed description of the water carrier 28, see FIGS. 4 and 5 and the corresponding description.

It is pointed out that in the same maritime power plant system 10, a combination of two or three of the different examples of transporting means 28 can coexist.

In order to increase the efficiency of the maritime power plant system 10, the reservoir means 26 is thermally insulated from the surrounding water.

According to one preferred embodiment, the level of the water inside the reservoir means 26 shall be lower or equal to the level of the water outside the floating platform means 20. This relationship is disclosed in FIG. 1, where the water level in the reservoir means 26 is lower than the water level in the ocean, i.e. outside the floating platform means 20.

According to another embodiment of the maritime power plant system 10, the hydraulic system 38 comprises a pressure transducer 40 (see FIGS. 10 and 11), and a hydraulic motor 42 connected to the pressure transducer 40.

Figure 2:
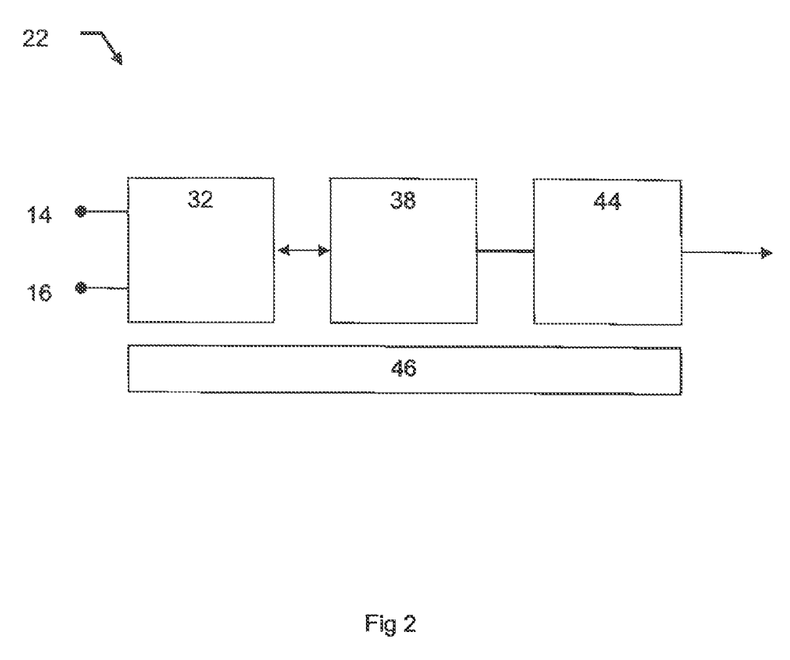
FIG. 2 is a schematic view of a power station system or means 22 according to the present invention.

In FIG. 2 there is disclosed a schematic view of the power station system or means 22 according to the present invention. The heat engine system 32 comprises or is connected to a heat source 14, and a cooler means 16. As also is apparent in FIG. 2, the power station means 22 also comprises a hydraulic system 38 connected to the heat engine system 32, and operable to generate a constant rotation speed. Furthermore, the power station means 22 also comprises an electrical generator means 44 connected to the hydraulic system 38, and more exactly, to the hydraulic motor 42. The electrical generator means 44 is operable to generate electricity with a specific frequency and amplitude. As also is apparent in FIG. 2, the power station means 22 also comprises a control system 46 operable to control the process performance based on real time measurements of time, flow, temperature and pressure.

According to a preferred embodiment of the maritime power plant system 10, the energy cells $12_1, \ldots, 12_n$ are operable between a first phase, and a second phase, wherein, during the first phase, odd-numbered energy cells produce pressurized fluid, and even-numbered energy cells are cooling down, and during the second phase, odd-numbered energy cells are cooling down, and even-numbered energy cells produce pressurized fluid.

Figure 3:
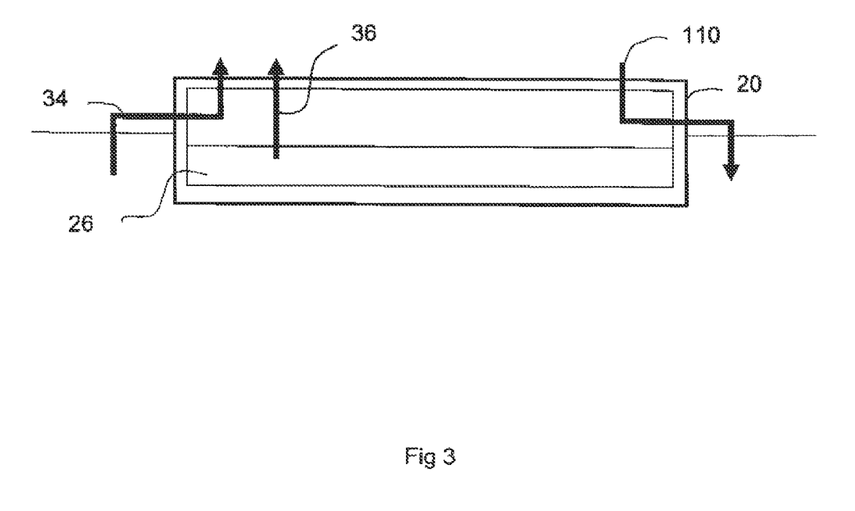
FIG. 3 is a schematic view of the floating platform means 20 with the reservoir means 26.

In FIG. 3 there is disclosed a schematic view of the floating platform means 20 comprised in the maritime power plant system 10. As is apparent in FIG. 3 the floating platform means 20 comprises a reservoir means 26 intended to store water. Also disclosed in FIG. 3 is a first feeding tube 34 for feeding warm water from the surface of the ocean to the heat source 14 (see FIG. 2). Furthermore, there is also disclosed a second feeding tube 36 for feeding water from the reservoir means 26 to the cooler means 16 (see FIG. 2). It is pointed out that the water in the reservoir means 26, which have been transported from the depth of the ocean, has a temperature lower than the temperature of the surface water. As also is apparent in FIG. 3 there is also a water flushing tube 110 for flushing of waste water from the maritime power plant system 10.

Figure 4:
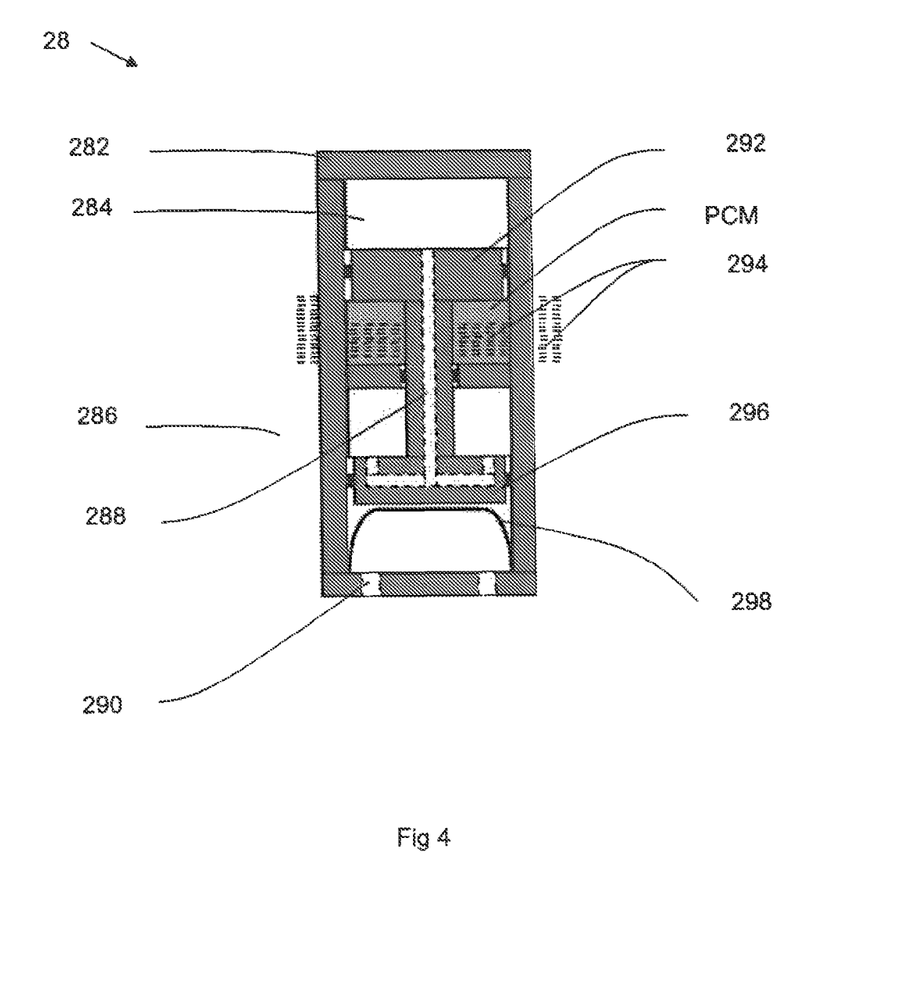
FIG. 4 is a schematic view of the water carrier 28 in a first state.
Figure 5:
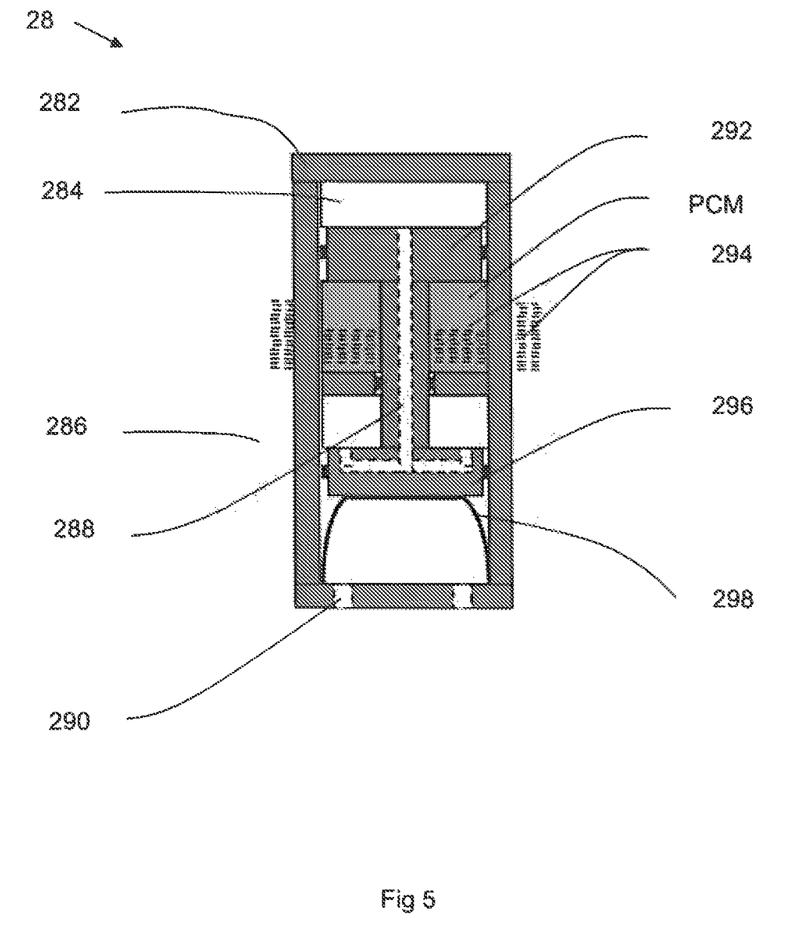
FIG. 5 is a schematic view of the water carrier 28 in a second state.

In FIG. 4 there is disclosed a schematic view of the PCM-based water carrier 28 in a first state, and in FIG. 5 there is disclosed a schematic view of the water carrier 28 in a second state. As is apparent in both FIGS. 4 and 5, the water carrier 28 comprises a high pressure vessel 282, gas under high pressure 284, surrounding water 286, a gas channel 288, water inlet/outlet 290, a master piston 292, phase change material (PCM), flanges 294, a slave piston 296, and a flexible membrane 298. The master and slave pistons 292 and 296 are connected via a rod with a channel 288 for gas levelling.

The function of the water carrier 28 will now be described with reference to first FIG. 4, and thereafter to FIG. 5. The first state disclosed in FIG. 4 is when it is floating. Cold water from the bottom cools the PCM, which freezes and contracts. The pistons 292 and 296 are forced down by the gas 284. When the slave piston 296 moves it presses the water out from the vessel 282, thus making the vessel 282 lighter. Consequently, the vessel 282 floats up to the water surface.

The second state disclosed in FIG. 5 is when it is sinking. Warm water from the surface heats the PCM, which melts and expands. The master piston 292 is forced up by the PCM. The slave piston 296 is forced up by the connecting rod. The gas 284 is compressed and acts like a spring. When the slave piston 296 moves it leaves space for surrounding water to fill the membrane 298 thus making the vessel 282 heavier, because water has a higher density than PCM. The vessel 282 sinks down to the bottom. Since the gas chambers 284 are connected the gas pressure acts on both pistons 292 and 296 making the spring force higher.

Furthermore, the floating platform means 20 can be built from concrete, steel, composites or other material suitable for long term offshore use. The floating platform means 20 could also host other machines, e.g. for the production of hydro oxygen. The floating platform means 20 shall allow for ships to dock and helicopters to land.

It is also pointed out that the transporting means 28 shall be flexible mounted to allow for service and repair at service level.

Figure 6:
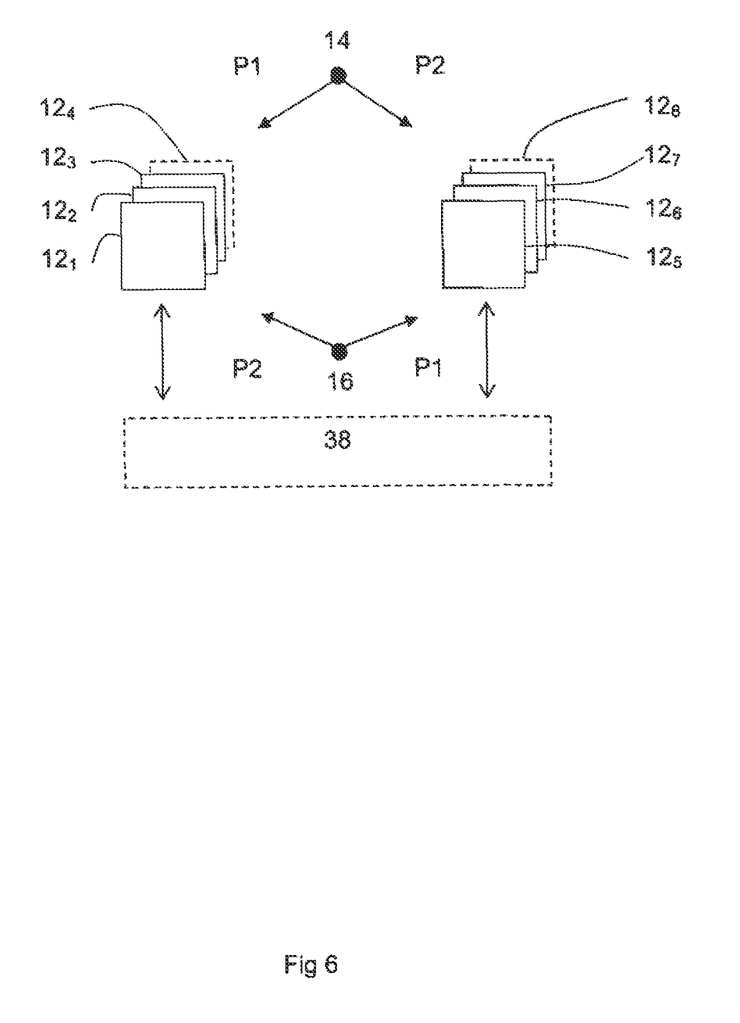
FIG. 6 discloses schematically a configuration with two groups of energy cells 12 comprised in a power station system 22.

In FIG. 6 there is schematically disclosed a configuration with two groups of energy cells 12 comprised in a power station system or means 22. As is schematically disclosed in FIG. 6, the energy cells $12_1$-$12_4$ are connected, and work in parallel, and the energy cells $12_5$-$12_8$ are connected, and work in parallel. Also disclosed in FIG. 6 is the heat source 14 connected to the energy cells, and the cooler means 16 connected to the energy cells. Furthermore, in FIG. 6 there is also disclosed the hydraulic system 38 connected to the heat engine system 32 (not disclosed in FIG. 6) comprising the energy cells $12_1$-$12_8$. In the first part of the cycle (Phase 1; P1), the heat source 14 heats the energy cells $12_1$-$12_4$, while the cooler means 16 cools the energy cells $12_5$-$12_8$. In the second part of the cycle (Phase 2; P2), the heat source 14 heats the energy cells $12_5$-$12_8$, while the cooler means 16 cools the energy cells $12_1$-$12_4$. The temperature difference between the heat source 14 and the cooler means 16 is adapted to the selected PCM characteristics. It should normally be at least 20° C. to get an acceptable efficiency and power output.

Figure 7:
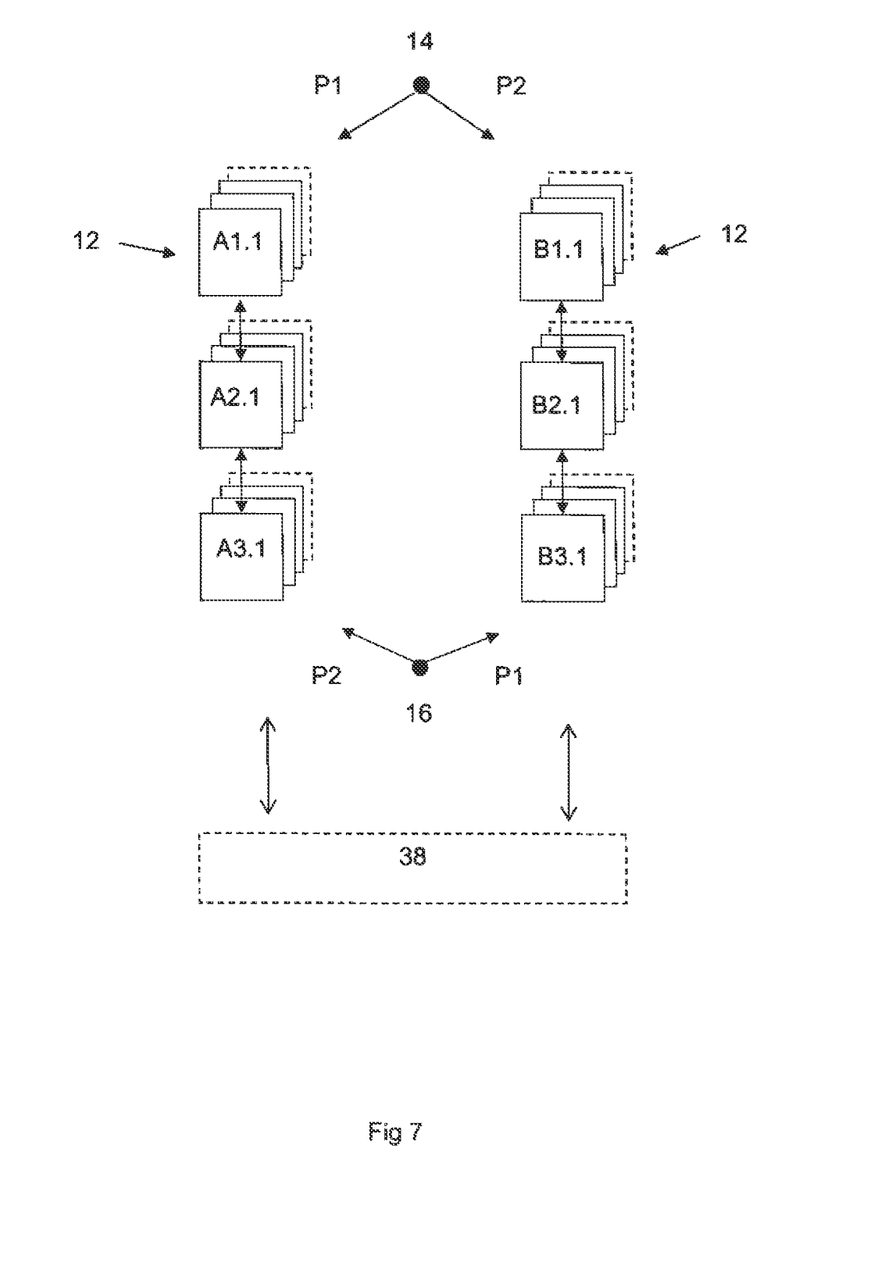
FIG. 7 discloses schematically a configuration with six groups of energy cells 12 connected in series and comprised in a power station system 22.

In FIG. 7 there is schematically disclosed a configuration with six groups of energy cells 12 comprised in a power station system 22. The groups A 1.1, A 2.1 and A 3.1 are connected in series and the groups B 1.1, B 2.1 and B 3.1 are also connected in series, in order to reuse heat and increase the efficiency. Also disclosed in FIG. 7 is the heat source 14 connected to the energy cells 12, and the cooler means 16 also connected to the energy cells 12. Furthermore, in FIG. 7 there is also disclosed the hydraulic system 38 (not disclosed in FIG. 7) comprising all the energy cells 12. In the first part of the cycle (Phase 1; P1), the heat source 14 heats the energy cells 12 in the group A 1.1, implying that the PCM in these energy cells are melting. Surplus heat from the energy cells in the group A 2.1 is used to heat the energy cells in the group A 3.1. This means that the PCM in the energy cells 12 in A 2.1 is freezing and the PCM in the energy cells 12 in A 3.1 is melting. Surplus heat from the energy cells in the group B 1.1 is used to heat the energy cells in the group B 2.1. This means that the PCM in the energy cells in B 1.1 is freezing and the PCM in the energy cells in B 2.1 is melting. The cooler means 16 cools the PCM in the energy cells 12 in B 3.1.

In the second part of the cycle (Phase 2; P2), the heat source 14 heats the energy cells 12 in the group B 1.1, implying that the PCM in these energy cells are melting. Surplus heat from the energy cells in B 2.1 is used to heat the energy cells in B 3.1. This means that the PCM in the energy cells in B 2.1 is freezing and the PCM in the energy cells in B 3.1 is melting. Surplus heat from the energy cells in group A 1.1 is used to heat the energy cells in the group A 2.1. This means that the PCM in the energy cells 12 in A 1.1 is freezing and the PCM in the energy cells in A 2.1 is melting. The cooler means 16 cools the energy cells 12 in the group A 3.1, implying that the PCM in the energy cells 12 in A 3.1 is freezing.

According to a preferred embodiment of the power station system 22, the energy cells $12_1$-$12_n$ are connected in a sequence, and the heat source 14 is connected to the first energy cell $12_1$, and the cooler means 16 is connected to the last energy cell $12_n$. During the first phase, odd-numbered energy cells $12_1$, $12_3$, $12_5$, . . . produce pressurized fluid, and even-numbered energy cells $12_2$, $12_4$, $12_6$, . . . are cooling down, and during the second phase, odd-numbered energy cells $12_1$, $12_3$, $12_5$, . . . are cooling down, and even-numbered energy cells $12_2$, $12_4$, $12_6$, produce pressurized fluid.

The reuse could be done in one or more steps. Each step requires a temperature difference between the heat source 14 and the cooler means 16 of approximately 20° C. If for example we have a heat source 14 at 80° C. and a cooler means 16 at 20° C. we could reuse heat in two steps, i.e. 2×3 groups of energy cells 12 (as in FIG. 7).

According to a further embodiment, the pressure transducer 40 is operable to reduce the pressure in the pressurized fluid from the energy cells $12_1$-$12_n$.

Furthermore, the hydraulic motor 42 in the power station system 22 is operable to generate the constant rotation speed during variable torque.

Figure 8:
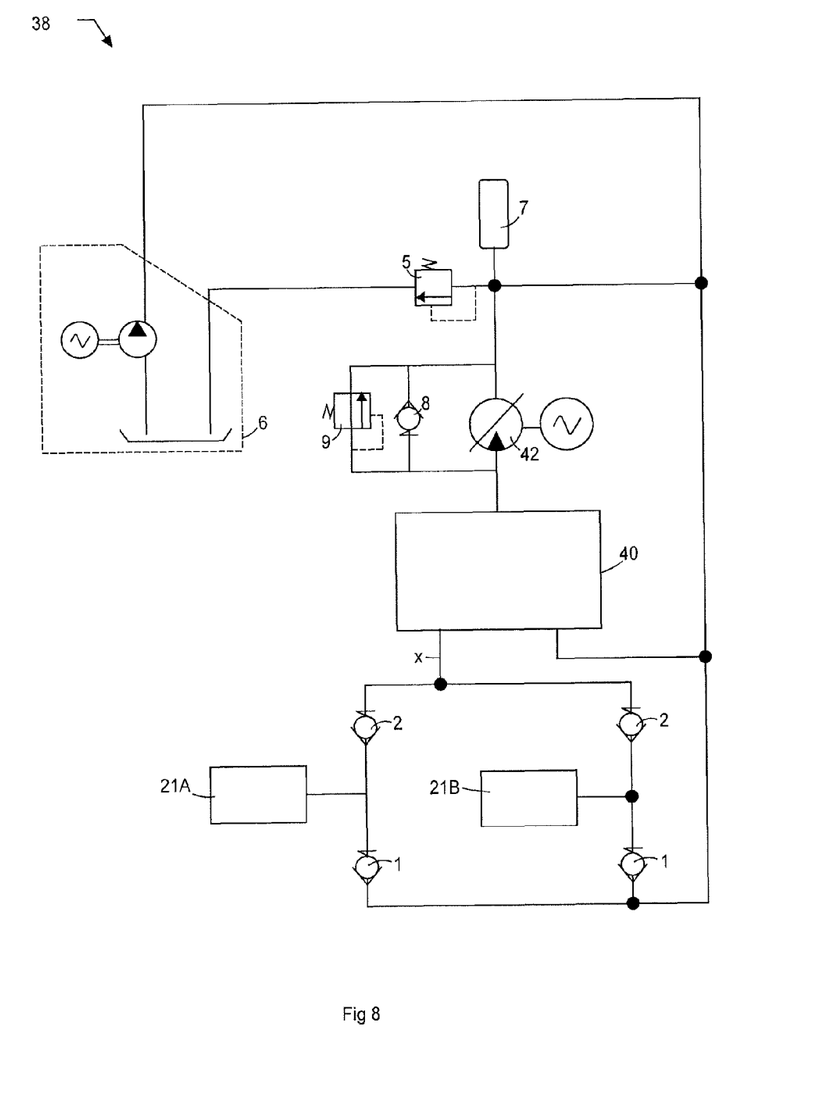
FIG. 8 is a block diagram of a first embodiment of a hydraulic system 38.

In FIG. 8 there is disclosed a block diagram of a first embodiment of a hydraulic system 38. The embodiment disclosed in FIG. 8 comprises a hydraulic motor 42 for the working of an electric generator for generating electric energy. Furthermore, the hydraulic system 38 also comprises a first hydraulic pressure producer 21A and a second hydraulic pressure producer 21B, both in hydraulic connection with the hydraulic motor 42. It is pointed out that each of the hydraulic pressure producers 21A and 21B corresponds and is equal to the heat engine system 32 described earlier in this description. The first and second hydraulic pressure producers 21A, 21B are both operable to transfer hydraulic energy to the hydraulic motor 42. As is apparent in FIG. 8, the first and second hydraulic pressure producers 21A, 21B are mutually hydraulically connected in parallel. The first and second hydraulic pressure producers 21A, 21B are arranged for working in cycles so that the first hydraulic pressure producer 21A delivers an outflow at the same time as the second hydraulic pressure producer 21B has an inflow, whereas the first hydraulic pressure producer 21A has an inflow at the same time as the second hydraulic pressure producer 21B delivers an outflow. The first and second hydraulic pressure producers 21A, 21B are arranged to work with a mutual phase difference of approximately 180 degrees. Furthermore, the hydraulic system 38 comprises a number of check valves 1, 2, and 8. The inflow to the hydraulic pressure producers 21A, 21B has a base pressure and passes the check valve 1. The outflow passes the check valve 2. The flow passing the point x in the block diagram is either emanating from the first hydraulic pressure producer 21A or from the second hydraulic pressure producer 21B. Furthermore, the hydraulic system 38 also comprises a pressure transducer 40 connected between the hydraulic pressure producers 21A and 21B, and the hydraulic motor 42. The pressure transducer 40 is operable to lower the hydraulic pressure from a higher pressure in a fluid to a lower pressure in the fluid. This will ensure a high reliability in operation and a long lifetime of the hydraulic motor 42.

In order to protect the hydraulic motor 42 against a too high pressure, the hydraulic system 38 also comprises a pressure reducing valve 9 which by-passes a flow besides the hydraulic motor 42 at a too high working pressure.

In order to protect the hydraulic motor 42 against cavitation there is a check valve 8 in the hydraulic system 38. The check valve 8 is operable to prevent that the pressure in front of the hydraulic motor 42 becomes lower than the base pressure. Cavitation can occur if the flow from the pressure transducer 40 temporarily is too low or if the displacement is too high in relation to the flow.

The hydraulic motor 42 can e.g. be an asynchronous machine with four poles or a synchronous machine with four poles, both of which gives a constant rotation speed at a constant power frequency. After the hydraulic motor 42, a smaller amount of the flow is passing to a base unit 6 via a pressure reducing valve 5 which is regulating the base pressure.

As also is apparent in FIG. 8, the hydraulic system 38 also comprises a flow accumulator 7 operable to stabilize the base flow in the system 38. It can be motivated to have a flow accumulator 7 in the hydraulic system 38 if the inflow to and outflow from the hydraulic pressure producers 21A, 21B fluctuate a lot or if the back flow from the base unit is too low.

It is pointed out that it is possible to have more than one hydraulic motor 42 in the hydraulic system 38 (not disclosed in any figure). If several hydraulic motors 42 are connected together for the operation of the generator at least one of the hydraulic motors 42 shall have a variable displacement.

When the hydraulic pressure producer 21A has completed half of its cycle, i.e. when it has reached 180 degrees, there are still stored energy in the fluid. Now the pressure will decrease during the following process and when the pressure has decreased to p1 also the displacement of the hydraulic motor 42 starts to decrease. The hydraulic motor 42 will still have the same rotation speed but the torque delivered to the generator will decrease in relation to the decreasing of the displacement and the pressure. The energy delivered to the generator will decrease faster and faster. The largest part of the energy stored in the fluid will be transferred to the generator during this phase.

The outflow of fluid from the hydraulic pressure producers 21A, 21B is started with a certain delay due to the fact that the pressure has to be raised before a flow is possible. As long as the pressure from the hydraulic pressure producer 21A is higher than the pressure from the hydraulic pressure producer 21B, the check valve 1 will be closed. The flow of fluid at the point x in the block diagram disclosed in FIG. 8 emanates in principle from the hydraulic pressure producer 21A from that point when the working cycle (360 degrees) of the hydraulic pressure producer 21A has passed a number of degrees until it has passed more than half of its cycle. During the rest of the time, the flow will of course emanate from the hydraulic pressure producer 21B. If it is supposed that the hydraulic pressure producer 21A is started at the phase zero, and if the delay corresponds to 40 degrees of the cycle, will the flow at the point x emanate from the hydraulic pressure producer 21A during 40-220 degrees, from the hydraulic pressure producer 21B during 220-400 degrees, and from the hydraulic pressure producer 21A during 400-580 degrees.

Figure 9:
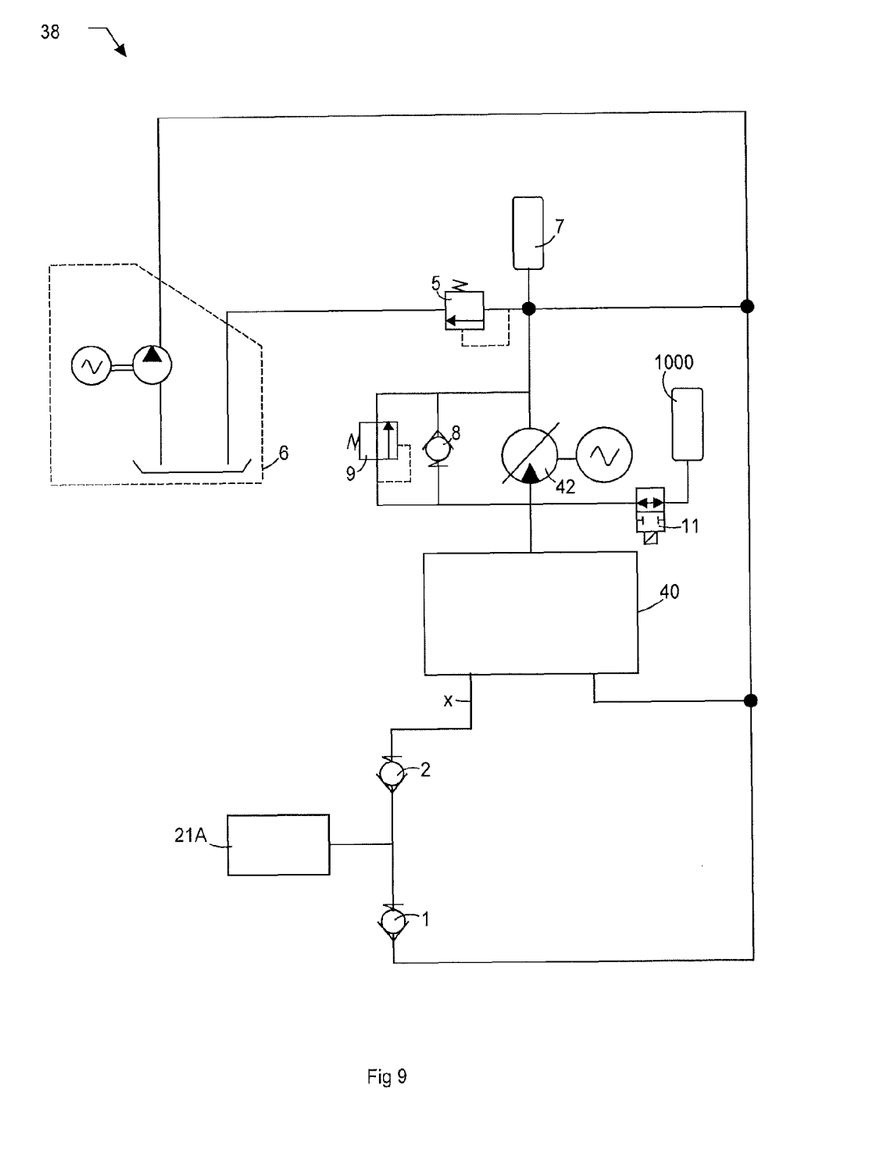
FIG. 9 is a block diagram of a second embodiment of a hydraulic system 38.

In FIG. 9 there is disclosed a block diagram of a second embodiment of a hydraulic system 38. In this embodiment there is only one hydraulic pressure producer 21A, and consequently only one check valve each of 1 and 2, as is apparent in FIG. 9. Another difference between the embodiments disclosed in FIGS. 8 and 9 is that in this second embodiment there is also a flow accumulator 1000 and a valve 11. The other similar elements occurring in both the embodiments have been provided with the same reference signs and will not be described in detail again.

As is apparent in FIG. 9 the outflow from the pressure transducer 40 is connected to the flow accumulator 1000 via the valve 11, and to the hydraulic motor 42 which in turn is operating an electric generator.

The flow accumulator 1000 has a relatively high charging pressure and the pressure is assumed to increase to the maximum operating pressure when it has achieved the maximum charging. The flow accumulator 100 is operable to accumulate fluid when a flow from the hydraulic pressure producer 21A is larger than an intended flow to the hydraulic motor 42, and to deliver fluid when the flow from the hydraulic pressure producer 21A is smaller than the intended flow to the hydraulic motor 42. The valve 11 is either open or closed, which is controlled either hydraulically or electrically. The combination of the flow accumulator 1000 and the valve 11 gives an opportunity to use the compressed energy in the hydraulic system 38.

It is pointed out that there are mainly three different pressure levels in the hydraulic system 38: a base pressure p1 which is prevailing downstream in relation to the hydraulic motor 42 and to the check valve 1, and also between the check valves 1, 2 when there is an inflow to the hydraulic pressure producer 21A; a fluctuating high pressure p2 which is prevailing between the check valves 1, 2 at outflow and between the check valve 2 and the pressure transducer 40; a fluctuating operating pressure between the pressure transducer 40 and the hydraulic motor 42.

According to an embodiment of the hydraulic system 38, at least one of the hydraulic pressure producers 21A, 21B is a pump. Furthermore, the pump can be linear with pressure strokes for fluid delivery and return strokes for fluid intake.

Figure 10:
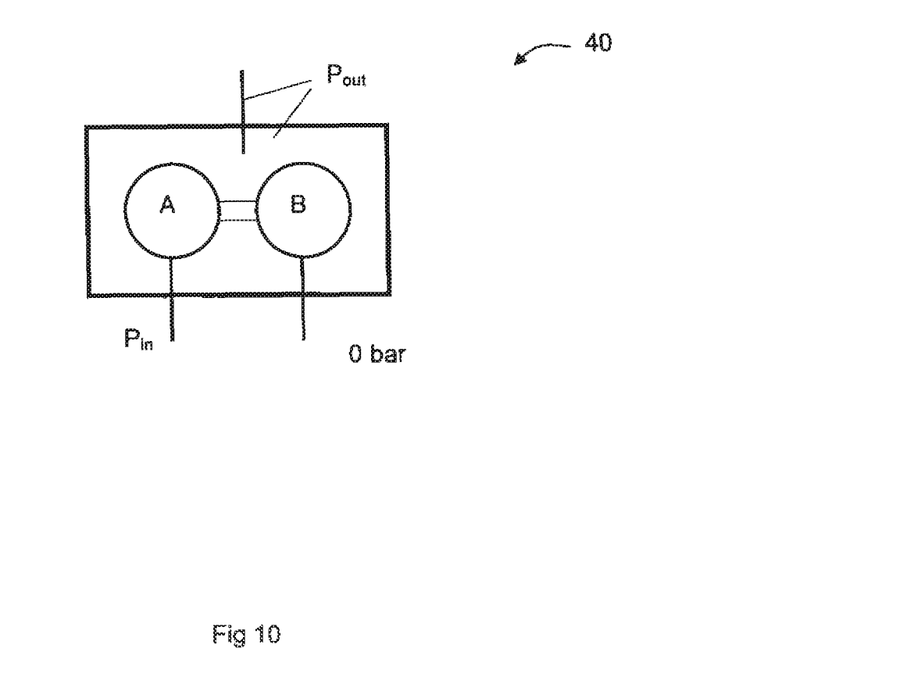
FIG. 10 is a block diagram of a first embodiment of a pressure transducer 40.

In FIG. 10 there is disclosed a block diagram of a first embodiment of a pressure transducer 40. The pressure transducer 40 is operable to transform a pressure of a fluid from one pressure level $P_{in}$ to another pressure level $P_{out}$. This embodiment disclosed in FIG. 10 comprises a pair of hydraulic rotating machines A, B that are mutually mechanically interconnected in such a way that the first machine A can run the second machine B. The machines A, B are mounted in a substantially closed room, and each of the machines A, B is in hydraulic connection with the closed room. As also is apparent in FIG. 10, each of the machines A, B is provided with a hydraulic inlet ($P_{in}$) and a hydraulic outlet ($P_{out}$). It is pointed out that the embodiment disclosed in FIG. 10 is used for decreasing the pressure of the fluid. This means that each one of the machines A, B is in hydraulic connection with the closed room via the hydraulic outlet ($P_{out}$). If on the other hand the pressure transducer 40 should be used for increasing the pressure of the fluid, (not disclosed in the figures) each one of the machines A, B is in hydraulic connection with the closed room via the hydraulic inlet. In the embodiment disclosed in FIG. 10, the closed room is in hydraulic connection with a fluid source of the pressure level $P_{out}$, the hydraulic rotating machine A is in hydraulic connection with a fluid source of the pressure level $P_{in}$, and the hydraulic rotating machine B is in hydraulic connection with a fluid source of the pressure level 0 bar. If the machines A, B are of the same size, and the maximum normal pressure is 200 bar, the embodiment disclosed in FIG. 10 will give the FIGS. 400 bar for $P_{in}$ and 200 bar for $P_{out}$.

According to an embodiment of the pressure transducer 40, the mutually mechanically interconnected machines A, B are interconnected via at least one shaft coupling.

Figure 11:
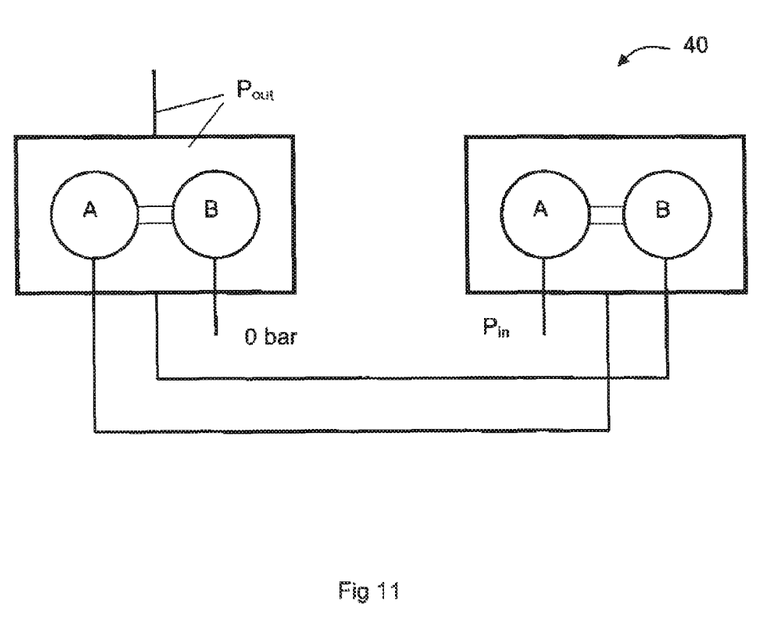
FIG. 11 is a block diagram of a second embodiment of a pressure transducer 40.

In FIG. 11 there is disclosed a block diagram of a second embodiment of a pressure transducer 40 according to the present invention. In this embodiment of the pressure transducer 40 there are two closed rooms, each comprising two hydraulic rotating machines A, B. The hydraulic rotating machines A, B are mutually mechanically interconnected in such a way that for each pair of machines A, B and for each closed room, the first machine A can run the second machine B. As is apparent in FIG. 11, the pressure transducer 40 is provided with a hydraulic inlet ($P_{in}$) and a hydraulic outlet ($P_{out}$). Furthermore, the machine A in the left pair of machines is hydraulically connected to the second, right room, whereas the machine B in the right pair of machines is hydraulically connected to the first, left room. It is pointed out that the embodiment disclosed in FIG. 11 is used for decreasing the pressure of the fluid. Using the same pressure levels as in FIG. 10, in the case disclosed in FIG. 11, i.e. if two pressure transducers 40 according to FIG. 10 are connected in accordance with FIG. 11, will give the FIGS. 600 bar for $P_{in}$ and 200 bar for $P_{out}$.

The same applies for the case where three pressure transducers 40 according to FIG. 10 are connected in series (not disclosed), i.e. it will give the FIGS. 800 bar for $P_{in}$ and 200 bar for $P_{out}$.

The invention is not limited to the described embodiments. It will be evident for those skilled in the art that many different embodiments are feasible within the scope of the following Claims.

The invention claimed is:

1. A power station system to generate energy, said power station system comprising a heat engine system and a hydraulic system connected to said heat engine system, wherein said heat engine system comprises n number of energy cells ($12_1, \ldots, 12_n$), wherein n is an integer, and n≥2, a heat source connected to said energy cells ($12_1, \ldots, 12_n$), and a cooler connected to said energy cells ($12_1, \ldots, 12_n$), wherein each energy cell ($12_1; \ldots; 12_n$) comprises at least one path for a fluid, a volume of a phase change material (PCM) disposed within each energy cell ($12_1; \ldots; 12_n$), and a membrane situated between said PCM and said fluid such that said fluid is pressurized through volume expansion of the PCM when the PCM changes from solid phase to liquid phase, wherein said energy cells ($12_1, \ldots, 12_n$) operate between a first phase, and a second phase, wherein, during said first phase, a first n/2 of said energy cells produce pressurized fluid, and a second n/2 of said energy cells are cooling down, and during said second phase, the first n/2 of said energy cells are cooling down, and the second n/2 of said energy cells produce pressurized fluid, wherein said hydraulic system comprises a pressure transducer hydraulically connected between said energy cells and a hydraulic motor, and wherein the pressurized fluid from the energy cells is passed to the hydraulic motor via said pressure transducer to generate a constant rotation speed.

2. A power station system according to claim 1, wherein said power station system also comprises an electrical generator connected to said hydraulic motor and generating electricity with a specific frequency and amplitude, and a control system controlling the process performance based on real time measurements of time, flow, temperature, pressure and power.

3. A power station system according to claim 2, wherein said control system monitors operational conditions, safety, and service intervals of said power station system.

4. A power station system according to claim 1, wherein said energy cells ($12_1, \ldots, 12_n$) are connected in a sequence, and in that said heat source is connected to said first energy cell ($12_1$), and said cooler is connected to said last energy cell ($12_n$), and wherein, during said first phase, every second energy cell ($12_1, 12_3, 12_5, \ldots$) produces pressurized fluid, and every other second energy cell ($12_2, 12_4, 12_6, \ldots$) is cooling down, and wherein, during said second phase, every second energy cell is cooling down, and every other second energy cell produces pressurized fluid.

5. A power station system according to claim 1, wherein n is an even integer, and wherein said first n/2 number of energy cells ($12_1, \ldots, 12_{n/2}$) are connected, and work in parallel, and wherein said second n/2 number of energy cells ($12_{n/2+1}, \ldots, 12_n$) are connected, and work in parallel.

6. A power station system according to claim 1, wherein said pressure transducer reduces the pressure in said pressurized fluid from said energy cells ($12_1, \ldots, 12_n$).

7. A power station system according to claim 1, wherein said hydraulic motor generates said constant rotation speed during variable torque, and variable displacement.

8. A power station system according to claim 1, wherein the temperature difference, $T_d$, between said heat source and said cooler is at least 20° C.

* * * * *